Patented Nov. 6, 1928.

1,690,641

UNITED STATES PATENT OFFICE.

EMIL KRAUS, OF THE HAGUE, NETHERLANDS, ASSIGNOR TO FABRIEK VAN CHEMISCHE PRODUCTEN, OF SCHIEDAM.

MANUFACTURE OF NEW SULPHURIZED DERIVATIVES OF NAPHTHOLS.

No Drawing. Application filed February 16, 1926, Serial No. 88,705, and in the Netherlands November 24, 1925.

A number of proposals have been made for preparing derivatives of β-naphthol containing sulphur.

Thus German specification No. 35,788 proposes heating the naphthol with sulphur and lead oxide at 180–200° C. At a later date Lange (Ber. der deutschen chemischen Gesellschaft vol. 21 page 260) has described the production of sulphurized compounds by boiling the naphthol in alkaline solution with an excess of sulphur, and Henriques (Ber. der deutschen chemischen Gesellschaft vol. 27 page 2993) has obtained similar compounds by using sulphur chloride. As Henriques has shown in his work (Ber. der deutschen chemischen Gesellschaft vol. 27 page 2998 et seq.), dioxydinaphthylsulphide is formed almost exclusively, when the sulphurization is conducted in aqueous medium according to the directions of Lange. This substance, as well as the product obtained by means of sulphur chloride, shows the characteristic reaction of yielding a brick-red precipitate with potassium ferricyanide in alkaline solution, the by-products formed at the same time giving yellow-white ferricyanide compounds under the same conditions. The products are also insoluble, or difficultly soluble in chloroform and carbon disulphide.

By the present invention, compounds containing sulphur are formed by heating to boiling for a considerable time in an aqueous medium a mixture of a naphthol, an alkali, and powdered sulphur, with or without the addition of a phenol.

Preferably the quantity of alkali is less than that which is equivalent to the quantity of naphthol, or of naphthol and phenol, used; for example, the mixture may consist of an aqueous solution containing a naphthol, and the sodium salt of the naphthol, together with sulphur.

The new products are complicated derivatives containing sulphur and differing from the compounds hitherto known in that they are easily soluble in chloroform and carbon disulphide, and give a yellow-brown precipitate with potassium ferricyanide in alkaline solution, as distinguished from the brick-red or yellow-white precipitates obtained under the same conditions with the known compounds.

The new products are when dry bright yellow powders, which dissolve in alkali to a bright yellow solution and are readily soluble in acetone, and more difficultly soluble in alcohol. The alkaline solutions possess the property of becoming fixed on unmordanted cotton almost without production of colour, and act as mordants for fixing basic dyestuffs. These products are, however, of greatest importance as starting materials for the preparation of artificial tanning agents.

Similar compounds having the same valuable properties are also obtained when a mixture of β-naphthol and phenol is treated in the same manner.

The sulphurized products obtained according to the invention possess the property of reacting readily with aldehydes, such as formaldehyde, and sodium sulphite, yielding water-soluble compounds, which are of particular importance as artificial tanning agents.

Instead of β-naphthol there may be used α-naphthol or a homologue or derivative of either of these substances, and instead of phenol, a homologue or substitution derivative thereof may be used in admixture with the naphtholic body.

The following examples illustrate the invention:—

*Example 1.*—A mixture of 144 kilos of β-naphthol, 100 litres of water and 20 kilos of NaOH is boiled for a short time until dissolution is complete. 80 kilos of sulphur powder are then added and the mixture is boiled for 40–80 hours, under a reflux condenser until a sample yields on acidification a product which is easily soluble in cold chloroform or in carbon disulphide. The mass is then diluted with 250 litres of water, and to the cooled mass are added first 250 kilos of crystallized sodium-sulphide and then 80 kilos of formaldehyde of 40 per cent strength. The resin which at first separates from the liquid, dissolves after stirring for 2–3 hours with the formation of a thick syrup, which becomes thinner after standing for about 12 hours at ordinary temperature, and a sample after dilution with water no longer yields a precipitate on addition of an acid. This solution becomes entirely clear, after being kept at 70°–80° C. for an hour. The solution so obtained may be used, after having been neutralized directly for tanning purposes. If desired, however, the new product may be caused to separate by adding sodium chloride to the solution.

When preparing the sulphurized naphthols the quantity of alkali may be varied; thus it may be decreased, or may be increased to 40 kilos (i. e. one molecular proportion per each molecular proportion of the naphthol); also, the quantity of sulphur may be diminished to 48 kilos. Instead of formaldehyde, acetaldehyde may be used with similar result. An alkaline solution of the sulphurized naphthol obtained when using 80 kilos of sulphur yields a bright yellow-brown precipitate with potassium ferricyanide, whilst when less sulphur is used the precipitate obtained under similar conditions has a somewhat darker colour.

*Example 2.*—A mixture of 72 kilos of $\beta$-naphthol, 100 litres of water and 20 kilos of NaOH is boiled, and then 47 kilos of phenol are added. After adding to the mixture 80 kilos of sulphur powder the whole is boiled for 50–60 hours, under a reflux condenser. The mass is then diluted with 400 litres of water and 250 kilos of crystallized sodium sulphite and 80 kilos of formaldehyde of 40 per cent strength are added. After stirring for 2–3 hours, dissolution has occurred. After standing at ordinary temperature for 12 hours a sample diluted with water yields practically no precipitate on addition of an acid. Even after heating at 70–80° C. for an hour the acidified sample remains quite clear. The solution obtained may be used directly for tanning after having been neutralized, or the new product may be caused to separate in solid form by the addition of salt. In the sulphurizing reaction the quantities of alkali and of sulphur may be varied in the manner prescribed in Example 1. In the treatment with formaldehyde and sulphite valuable products which are still sufficiently soluble are obtained if the quantities of formaldehyde and sulphite are reduced to one half of those prescribed above. Instead of phenol there may be used a homologue or a substitution product thereof, and instead of formaldehyde acetaldehyde or another aldehyde may be used.

What I claim is:—

1. In the manufacture of new derivatives of naphthol the process which comprises heating to boiling in an aqueous medium under a reflux condenser a mixture of a naphtholic body, sulphur and an alkali.

2. In the manufacture of new derivatives of naphthol the process which comprises prolonged heating to boiling in an aqueous medium under a reflux condenser a mixture of a naphthol, a phenol, sulphur and an alkali.

3. In the manufacture of new derivatives of naphthol the process which comprises prolonged heating to boiling in an aqueous medium a mixture of a naphthol, sulphur and an alkali wherein the quantity of alkali is less than that chemically equivalent to the quantity of the naphthol.

4. In the manufacture of new derivatives of naphthol, the process which comprises heating to boiling in an aqueous medium a mixture of a naphtholic body, sulphur and an alkali and treating the obtained sulphurized derivatives with a lower aliphatic aldehyde and a soluble sulphite.

5. In the manufacture of new derivatives of naphthols, the process which comprises heating to boiling in an aqueous medium a mixture of a naphtholic body, sulphur and an alkali and treating the obtained sulphurized derivatives with a lower aliphatic aldehyde and a soluble sulphite until a sample of the reaction mixture when diluted with water no longer yields a precipitate on addition of acid.

6. In the manufacture of new derivatives of naphthols, the process which comprises heating to boiling in an aqueous medium a mixture of a naphtholic body, sulphur and an alkali, treating the obtained sulphurized derivatives with a lower aliphatic aldehyde and a soluble sulphite and isolating the formed product from the reaction mixture.

7. In the manufacture of new derivatives of naphthols, the process which comprises heating to boiling in an aqueous medium a mixture of a naphtholic body, sulphur and an alkali and treating the obtained sulphurized derivatives with a lower aliphatic aldehyde and a soluble sulphite.

8. In the manufacture of new derivatives of naphthols, the process which comprises heating to boiling in an aqueous medium a mixture of a naphtholic body, sulphur and an alkali and treating the obtained sulphurized derivatives with formaldehyde and a soluble sulphite.

9. In the manufacture of derivatives of naphthols, the process which comprises heating to boiling in an aqueous medium a mixture of a naphtholic body, sulphur and an alkali and treating the obtained sulphurized derivatives with a lower aliphatic aldehyde and a soluble sulphite until a sample of the reaction product when diluted with water no longer yields a precipitate on addition of an acid.

10. In the manufacture of new derivatives of naphthol, the process which comprises heating to boiling in an aqueous medium a mixture of a naphthol, a phenol, sulphur and an alkali and treating the obtained sulphurized derivatives with a lower aliphatic aldehyde and a soluble sulphite until a sample of the reaction mixture, when diluted with water, no longer yields a precipitate on addition of an acid.

11. In the manufacture of new derivatives of naphthol, the process which comprises heating to boiling in an aqueous medium a mixture of a naphthol, a phenol, sulphur and an alkali and treating the obtained sulphurized derivatives with formaldehyde and a soluble sulphite until a sample of the reaction mixture, when diluted with water, no longer yields a precipitate on addition of an acid.

12. In the manufacture of new derivatives of naphthol, the process which comprises heating to boiling in an aqueous medium a mixture of a naphthol, sulphur and an alkali wherein the quantity of alkali is less than that chemically equivalent to the quantity of the naphthol and treating the obtained sulphurized derivatives with a lower aliphatic aldehyde and a soluble sulphite, until a sample of the reaction mixture, when diluted with water, no longer yields a precipitate on addition of an acid.

13. In the manufacture of new derivatives of naphthol, the process which comprises heating to boiling in an aqueous medium a mixture of a naphthol, sulphur and an alkali wherein the quantity of alkali is less than that chemically equivalent to the quantity of the naphthol and treating the obtained sulphurized derivatives with formaldehyde and a soluble sulphite until a sample of the reaction mixture, when diluted with water, no longer yields a precipitate on addition of an acid.

14. As new compositions of matter, sulphur derivatives of naphtholic bodies, said derivatives being, when dry, yellow powders soluble in alkali to give bright yellow solutions which yield a yellow-brown precipitate with potassium ferricyanide, said derivatives being also soluble in chloroform, carbon disulphide and acetone, and more difficultly soluble in alcohol, and being useful as mordants.

15. As new compositions of matter, the products resulting from reacting upon the compositions defined in claim 14 with a lower aldehyde and a soluble sulphite, said products being soluble in water and possessing tanning properties.

In testimony whereof I hereunto affix my signature.

Dr. EMIL KRAUS.